(12) United States Patent
Wu et al.

(10) Patent No.: US 8,189,471 B2
(45) Date of Patent: May 29, 2012

(54) METHOD, SYSTEM AND OPTICAL NETWORK TERMINAL FOR MAPPING A SERVICE FLOW INTO A SERVICE TRANSMISSION CHANNEL

(75) Inventors: Wei Wu, Shenzhen (CN); Hai Gao, Shenzhen (CN); Lehong Niu, Shenzhen (CN); Weilong Ouyang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 12/175,324

(22) Filed: Jul. 17, 2008

(65) Prior Publication Data

US 2008/0273878 A1 Nov. 6, 2008

Related U.S. Application Data

(63) Continuation of application No. PCT/CN2007/000193, filed on Jan. 18, 2007.

(30) Foreign Application Priority Data

| Jan. 18, 2006 | (CN) | 2006 1 0033194 |
| Apr. 25, 2006 | (CN) | 2006 1 0077569 |
| May 25, 2006 | (CN) | 2006 1 0081096 |

(51) Int. Cl.
*H04L 12/26* (2006.01)
*H04J 3/22* (2006.01)
*H04J 14/00* (2006.01)

(52) U.S. Cl. .......... 370/232; 370/437; 370/468; 398/67; 725/129

(58) Field of Classification Search ........................ None
See application file for complete search history.

(56) References Cited

U.S. PATENT DOCUMENTS

| 7,382,982 | B2 | 6/2008 | Lee et al. |
| 2004/0208631 | A1 | 10/2004 | Song et al. |
| 2004/0247316 | A1* | 12/2004 | Soto et al. ....................... 398/47 |
| 2004/0258094 | A1* | 12/2004 | Bashan et al. ................ 370/486 |
| 2005/0008372 | A1 | 1/2005 | Hochbaum |
| 2005/0013314 | A1 | 1/2005 | Lim et al. |
| 2005/0147410 | A1 | 7/2005 | Smith |

(Continued)

FOREIGN PATENT DOCUMENTS

CN 1578200 A 2/2005

(Continued)

OTHER PUBLICATIONS

Fred Halsall "Computer Networking and the Internet", 5th edition, 2005, p. 333-335.*

(Continued)

*Primary Examiner* — Jianye Wu
(74) *Attorney, Agent, or Firm* — Leydig, Voit & Mayer, Ltd.

(57) ABSTRACT

A method for mapping a service flow to a service transmission channel includes: configuring determined configuration parameters for a message characteristic into an Optical Network Terminal (ONT); the ONT ensures that the received service flow matches the configured message characteristic; mapping the service flow to a specified service transmission channel. A system and an ONT for mapping the service flow to the service transmission channel are also provided, and the system sets a general service flow mapping module in the ONT. Service flows may be mapped to different service transmission channels based on any predetermined message characteristic by the method, system, and ONT of this invention and it meets the demand of the subdivision service QoS.

13 Claims, 7 Drawing Sheets

U.S. PATENT DOCUMENTS

| | | | |
|---|---|---|---|
| 2005/0265386 A1* | 12/2005 | Smith et al. | 370/466 |
| 2006/0133405 A1* | 6/2006 | Fee | 370/437 |
| 2006/0224764 A1* | 10/2006 | Shinohara et al. | 709/232 |
| 2006/0268869 A1* | 11/2006 | Boers et al. | 370/390 |
| 2008/0144622 A1* | 6/2008 | Platnic | 370/390 |

FOREIGN PATENT DOCUMENTS

| | | |
|---|---|---|
| CN | 1581789 A | 2/2005 |
| CN | 1601986 A | 3/2005 |
| CN | 1610279 A | 4/2005 |
| EP | 1548965 A2 | 6/2005 |
| WO | WO 2005/015836 A1 | 2/2005 |

OTHER PUBLICATIONS

Angelopoulos et al., "Efficient Transport of Packets with QoS in an FSAN-Aligned GPON," *IEEE Communications Magazine*, 92-98 (Feb. 2004).

"Gigabit-Capable Passive Optical Networks (G-PON): ONT Management and Control Itnerface Specification; G.984.4," *ITU-T Standard in Force*, 1-105 (Jun. 2004).

1st Office Action in corresponding Chinese Application No. 2006100775693 (Jan. 8, 2010).

1st Office Action in corresponding Chinese Application No. 200710195615.4 (Mar. 26, 2010).

Written Opinion of the International Searching Authority in corresponding PCT Application No. PCT/CN2007/000193 (Apr. 26, 2007).

"802.1D—Media Access Control (MAC) Bridges," IEEE Standard for Local and metropolitan area networks, Jun. 9, 2004, Institute of Electrical and Electronic Engineers, Inc., New York, New York.

"G.984.1—Gigabit-capable Passive Optical Networks (GPON): General characteristics," Series G: Transmission Systems And Media, Digital Systems And Networks, Digital sections and digital line system—Optical line systems for local and access networks, Mar. 2003, Institute of Electrical and Electronic Engineers, Inc., New York, New York.

"G984.2—Gigabit-capable Passive Optical Networks (GPON): Physical Media Dependent (PMD) layer specification," Series G: Transmission Systems And Media, Digital Systems And Networks, Digital sections and digital line system—Optical line systems for local and access networks, Mar. 2003, Institute of Electrical and Electronic Engineers, Inc., New York, New York.

"G.984.4—Gigabit-capable Passive Optical Networks (G-PON): ONT management and control interface specification," Series G: Transmission Systems And Media, Digital Systems And Networks, Digital sections and digital line system—Optical line systems for local and access networks, Jun. 2004, Institute of Electrical and Electronic Engineers, Inc., New York, New York.

"G984.3—Implementers Guide for ITU-T Rec. G.984.3 (Feb. 2004) Gigabit-capable Passive Optical Networks (G-PON): Transmission convergence layer specification," Series G: Transmission Systems And Media, Digital Systems And Networks, Feb. 17, 2006, Institute of Electrical and Electronic Engineers, Inc., New York, New York.

1st Office Action in corresponding Chinese Application No. 200610081096.4 (Sep. 25, 2009).

Communication pursuant to Article 94(3) EPC in corresponding European Application No. 07702125.1 (Jan. 12, 2011).

* cited by examiner

METHOD, SYSTEM AND OPTICAL NETWORK TERMINAL FOR MAPPING A SERVICE FLOW INTO A SERVICE TRANSMISSION CHANNEL

CROSS-REFERENCE TO RELATED APPLICATIONS

This application is a continuation of International Patent Application No. PCT/CN2007/000193, filed Jan. 18, 2007, which claims priority to Chinese Patent Application No. 200610033194.0, filed Jan. 18, 2006, Chinese Patent Application No. 200610077569.3, filed Apr. 25, 2006, and Chinese Patent Application No. 200610081096.4, filed May 25, 2006, all of which are hereby incorporated by reference in their entirety.

FIELD OF THE INVENTION

The invention relates generally to the field of optical network technology, and more particularly, to a method, a system and an Optical Network Terminal (ONT) for mapping a service flow to a service transmission channel.

BACKGROUND

Current broadband access technology mainly includes copper line access technology and optical access technology. An access network implemented with optical access technology is called an Optical Access Network (OAN). Passive Optical Network (PON) technology is an optical access technology with a point to multipoint transmission. A Giga-bit PON (GPON) is an evolution based on PON, which meets a higher rate requirement.

Figure 1:
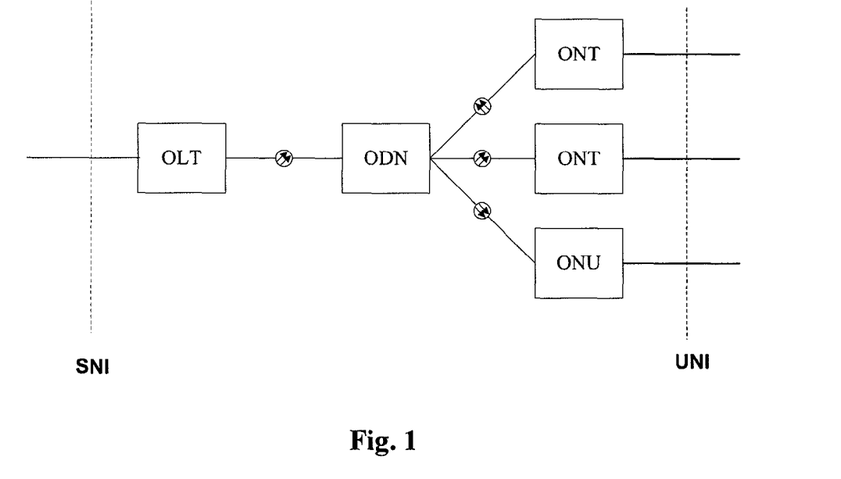
FIG. 1 is a diagram showing the structure of a PON system.

FIG. 1 is a diagram showing the structure of a PON system. The PON system mainly includes three parts, which are an Optical Line Terminal (OLT), an Optical Distribution Network (ODN) and an Optical Network Unit (ONU).

The OLT is used to provide a Network Side Interface (SNI) for the OAN, and to connect one or a plurality of ODNs. The ODN is used to distribute the downlink data from the OLT to each ONU via optical lines, and to make the uplink data from the ONU converge upon the OLT. The ONU is used to provide a User-side Network Interface (UNI), and to connect the ODN. An ONU is called an ONT if it also provides a function such as a user port for Ethernet or a user port for Plain Old Telephone Service (POTS). For the convenience of description, the ONU and the ONT are generally called the ONT.

In a GPON system, the OLT controls the ONT by means of an ONT Management and Control Interface (OMCI). Similar to ordinary service data, data in the OMCI is encapsulated by an OMCI Adapter into Asynchronous Transfer Mode (ATM) cell or Giga-bit PON Encapsulation Method (GEM) data blocks for transmission.

Service flows with GEM encapsulation are multiplexed by a Giga-bit PON Encapsulation Method PORT (GEM PORT) inside a Transmission Container (T-CONT). Each GEM PORT is assigned a GEM PORT identification (GEM PORT-ID). Service flows with ATM encapsulation are multiplexed by a Permanent Virtual Path/Permanent Virtual Channel (PVP/PVC) inside the T-CONT. Each PVP/PVC is assigned a Virtual Path Identification/Virtual Channel Identification (VPI/VCI). A Dynamic Bandwidth Assignment (DBA) Control module in a GPON Transmission Convergence (GTC) layer assigns dynamical bandwidths for each ONT by monitoring and managing all T-CONTs.

Descriptions are made below for GEM encapsulation, but all the descriptions also apply to ATM encapsulation.

Figure 2:
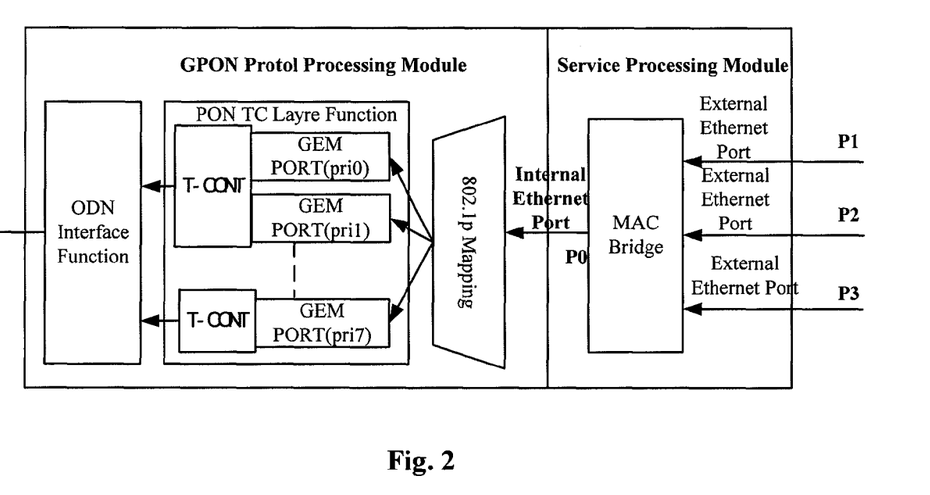
FIG. 2 is a diagram showing the structure of a ONT providing Ethernet services.

FIG. 2 is a diagram showing the structure of the ONT bearing Ethernet services. The ONT includes a Media Access Control (MAC) Bridge Module and an 802.1p Priority Mapping Module. The MAC Bridge Module may alternatively be a plain Ethernet Port Adapter Module.

In the ONT, the MAC Bridge Module realizes the function of Ethernet switching, and supports the access to a plurality of Ethernet interfaces. The MAC Bridge Module receives Ethernet frames from external Ethernet ports P1, P2 and P3, and switches the Ethernet frames by an internal Ethernet switching function to the internal Ethernet port P0 connected with 802.1p Priority Mapping Module. The 802.1p Priority Mapping Module receives Ethernet service flows from the internal Ethernet port, and maps Ethernet frames with different 802.1p priorities to different GEM PORTs, or maps Ethernet frames with a plurality of 802.1p priorities to one GEM PORT.

The operation of 802.1p priority mapping is specifically realized by means of OLT scheduling. The OLT, via the OMCI channel, instructs the ONT, to map Ethernet frames with different 802.1p priorities to corresponding GEM ports. In the OMCI protocol, various data of the OLT managing ONT is abstracted into a protocol-independent Management Information Base (MIB), and the basic information element for the MIB is the Manage Entity (ME). Based on the ONT configurations of various types, the OMCI defines each ME with which the OLT controls ONT. The ONT realizes the configuration management functions of each ME under the control of the OLT.

According to the current GPON technical standards, the ONT supports only the function of mapping Ethernet frames to GEM PORT according to the 802.1p priorities, but does not support the function of mapping to different GEM PORT according to other message characteristics. The other message characteristics mentioned here include: a Virtual Local Area Network (VLAN) ID, a Different Service Code Point (DSCP) field of the IP layer, an IP or MAC source address, an IP or MAC destination address, a protocol type, a TCP/UDP port number, etc. If Ethernet frames can not be mapped to different GEM PORT according to arbitrary message characteristics, it is not possible to provide specific QoS services via a single T-CONT for Ethernet frames with arbitrary message characteristics. Therefore, existing standards can not satisfy the requirements in case of precise service classification and QoS guarantee.

Figure 3:
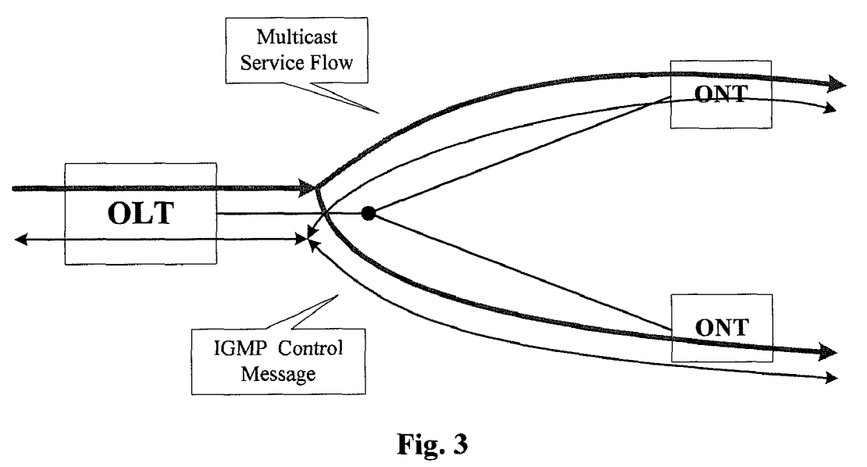
FIG. 3 is a diagram showing a multicast service transmission.

Additionally, in the GPON system, each ONT may be accessed by one or a plurality of multicast users. Referring to the diagram illustrating the multicast service transmission in FIG. 3, the OLT performs authentication processing after it receives an IGMP request message from a multicast user, and requests a multicast program stream specified by the user from a network side multicast source server when the authentication is successful. The specified multicast program stream is sent by the multicast source server to the OLT, and the multicast service flow is copied by the OLT to each multicast user via each ONT. In the meantime, the OLT periodically sends IGMP inquiry messages to the multicast user to detect whether the multicast user is on line. The IGMP request message and the IGMP inquiry message may each be called an IGMP control message. In the current GPON technology standard, the IGMP control messages are usually transmitted being mixed with data service such as that for surfing Internet. Because the priority of the data service such as that for surfing Internet is low, and therefore the QoS of IGMP control messages may not be guaranteed, thereby directly affecting the performance of multicast services.

The above is only a description of the transmission of IGMP control messages, but in fact, the same problems exist for other uplink control messages. The other uplink control messages include: control messages for Ethernet bearing PPP protocol (PPPoE), control messages for Dynamic Host Configuration Protocol (DHCP), control messages for Session Initialization Protocol (SIP), etc.

SUMMARY

Therefore, in one aspect, one embodiment of the invention provides a method for mapping a service flow to a service transmission channel in a PON system. In another aspect, one embodiment of the invention provides a system and an ONT for mapping a service flow to a service transmission channel in a PON system. Service flows may be mapped to different service transmission channels based on the message characteristics of the service flows, in order to guarantee the QoS of sub-divided services.

One embodiment of the invention provides a method for mapping a service flow to a service transmission channel, including:

A. configuring an Optical Network Terminal (ONT) with configuration parameters for a message characteristic;

B. mapping a service flow to a specified service transmission channel when it is determined that the service flow matches the configured message characteristic after the service flow is received by the ONT.

One embodiment of the invention provides a system for mapping a service flow to a service transmission channel, including an ONT and an OLT.

The OLT is configured to receive configuration parameters for a message characteristic from a configuration terminal, and to send the configuration parameters for the message characteristic to the ONT after processing.

The ONT is configured to receive the configuration parameters for the message characteristic distributed by the OLT, and perform configuration; and to map the service flow to a specified service transmission channel, when it is determined that the service flow received matches the configured message characteristic after the service flow is received.

An Optical Network Terminal (ONT) provided in one embodiment of the invention includes a service processing module and a general service flow mapping module.

The service processing module is configured to receive a service flow from a user, and to send the service flow to the general service flow mapping module;

The general service flow mapping module is configured for configuring with configuration parameters for a message characteristic distributed by the OLT, receiving the service flow from the service flow processing module, and mapping the service flow to the service transmission channel in a specified optical network protocol processing module when it is determined that the service flow received matches the message characteristic configured.

The method, system and ONT for mapping a service flow to a service transmission channel provided in one embodiment of the invention, maps a service flow which matches a configured message characteristic to a specified service transmission channel, when the ONT determines that the received service flow matches the configured message characteristic by configuring the determined configuration parameters for the message characteristic into the ONT. Therefore, the method, system and ONT provided in one embodiment of the invention may support the mapping of service flows to different service transmission channels according to predetermined arbitrary message characteristics, ensuring the QoS requirement of sub-divided service flows. The arbitrary message characteristics include: 802.1p priority, VLAND ID, DSCP field of an IP layer, IP or MAC source address, IP or MAC destination address, protocol type, and TCP/UDP port number, etc.

DETAILED DESCRIPTION

The invention is described as follows in detail by reference to the accompanying figures and embodiments, in order to make the purposes, the technical solutions and the advantages of the invention more obvious.

The method for mapping a service flow to a service transmission channel provided in one embodiment of the invention includes: configuring an ONT with configuration parameters for a message characteristic; mapping a service flow to a specified service transmission channel when it is determined that the service flow matches the configured message characteristics after the service flow is received by the ONT.

Figure 4:
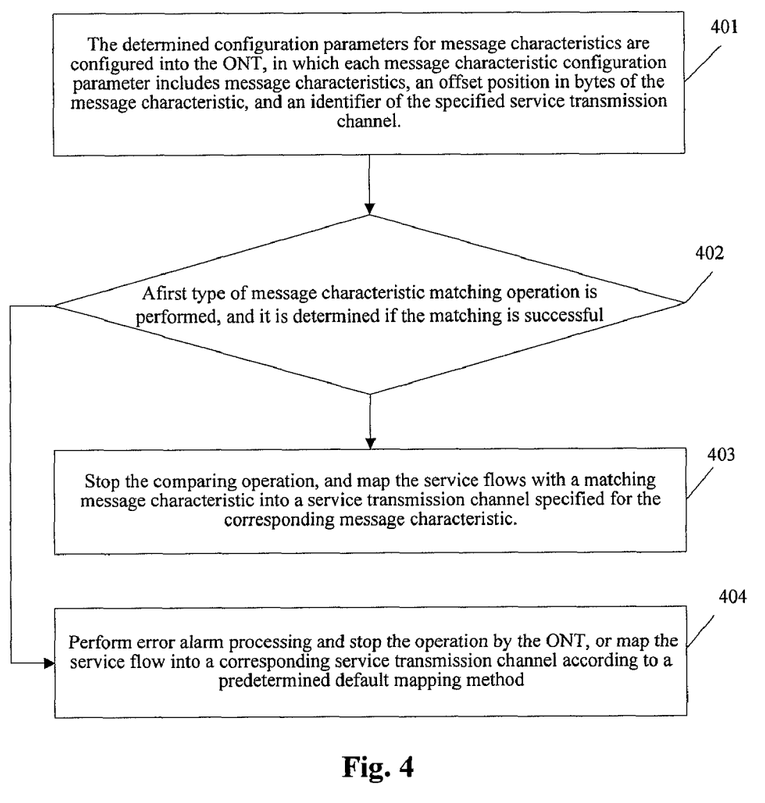
FIG. 4 is a flow chart showing the method for mapping a service flow to a service transmission channel in the first embodiment of the invention.

FIG. 4 is a flowchart showing the method for mapping a service flow to a service transmission channel in the first embodiment of the invention. The method includes the following steps:

Step 401: The determined configuration parameters for message characteristics are used to configure the ONT, in which each message characteristic configuration parameter includes message characteristics, an offset position in bytes of the message characteristic, and an identifier of the specified service transmission channel.

The message characteristic is a value of a characteristic field in the message data frame, for example, for an IP address 10.11.1.1, the value of the message characteristic includes 4 bytes (00001010, 00001011, 00000001 and 00000001). The offset position in bytes of the message characteristic is that how many bytes spacing exist from the beginning of the message to the above specified message characteristic field. For example, the distance between the source IP address field and the beginning of the Ethernet message is 26 bytes.

The message characteristics in one embodiment of the invention may include: an Ethernet source address and an Ethernet source address group, an Ethernet destination address and an Ethernet destination address group, a VLAND ID, an 802.1p priority, an IP source address and an IP source address section, an IP destination address and an IP destination address section, an IP DSCP field, an IP protocol type, a TCP/UDP port number, etc. When in actual use, the set of message characteristics may be expanded time after time, resulting in its inclusion of the message characteristics in the general representation method of message characteristics. The length of the message characteristic has no limitation, but for the simplicity in hardware processing in actual applications, the length of the message characteristic is preferably 2 to the power of an integer, such as 4, 8 and 16 bytes.

The service transmission channel may be a GEM PORT of GEM manner, or a PVP/PVC of ATM encapsulation manner.

Step 402, Matching operation for a first type message characteristic is performed after a service flow is received by the ONT. If the matching is successful, step 403 is executed; otherwise, step 404 is executed.

The matching operation for the first type of message characteristic includes specifically the following steps: for one message characteristic parameter configured with, first extract a part of data consisting of a small amounts of bytes which equal to the length of message characteristic field, the said part of data is extracted from a service flow data frame just at the offset position that indicated by configuration parameter; then comparing the said part of data with the corresponding message characteristic field. Step 403 is executed if it is determined that the part of data and the corresponding message characteristic match each other. Step 404 is executed if it is determined by the ONT that the part of data in the service flow does not match any of the configured message characteristics.

Step 402 further includes before the message characteristic matching operation: determining by the ONT whether the ONT itself supports a general service flow mapping operation. If the ONT itself supports the general service flow mapping operation, the message characteristic matching procedure is executed; otherwise, mapping all service flows received to a fixed service transmission channel.

Step 403, the comparing operation is stopped, and the service flows with a matching message characteristic are mapped to a service transmission channel specified for the corresponding message characteristic.

In step 403, mapping the service flows with the matching message characteristic to the specified service transmission channel may further include remarking the priority of the service flow; or Step 403 further includes before mapping the service flows with the matching message characteristic to the specified service transmission channel: remarking the priority of the service flow. In that case, mapping the service flows with the matching message characteristic to the specified service transmission channel includes: mapping the service flow to the specified service transmission channel according to the remarked priority.

Step 404, error alarm processing is performed and the operation by the ONT is stopped, or the service flow is mapped to a corresponding service transmission channel according to a predetermined default mapping method.

In the embodiment, step 404 is optional.

If the message characteristic is a sequence of continuous bytes in the message, the method shown in FIG. 4 may satisfy the requirement for hardware processing. If the message characteristic is not a sequence of continuous bytes in the message, but two value ranges, such as the specified value range of source IP address and TCP port number of message, the method shown in FIG. 4 may not be used. For the case that the message characteristic is not a sequence of continuous bytes in the message, the bytes which do not belong to the message characteristics sandwiched between the message characteristics are filtered out using a mask for message characteristic in one embodiment of the invention. The message characteristic mask may be represented using 1 matching or 0 matching. In the manner of 1 matching, each bit which is needed in the message characteristic field is represented with 1; each bit which is not needed in the message characteristic field is represented with 0. In the manner of 0 matching, each bit which is needed in the message characteristic field is represented with 0; each bit which is not needed in the message characteristic field is represented with 1. Thus, the message characteristic may be obtained by a bitwise AND operation between the message characteristic field and the mask for the message characteristic. By the combination of the message characteristic, the mask for the message characteristic and the offset position in bytes of the message characteristic, any message characteristic in the message, including the 9 types of message characteristic previously mentioned and other message characteristics, may be determined easily and quickly.

Figure 5:
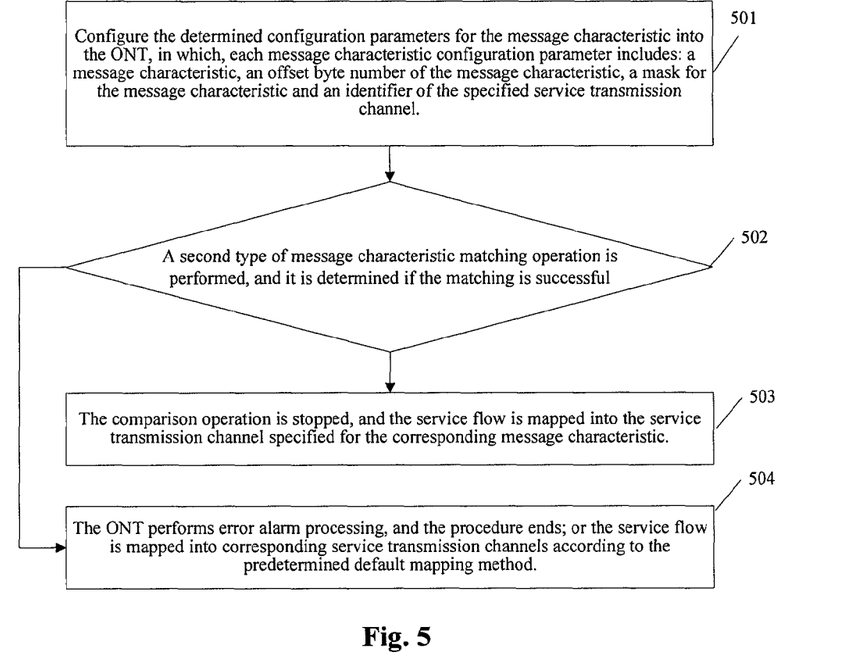
FIG. 5 is a flow chart showing the method for mapping a service flow to a service transmission channel in the second embodiment of the invention.

FIG. 5 is a flow chart showing the method for mapping a service flow into a service transmission channel in the second embodiment of the invention. The method includes the following steps.

Step 501, the determined configuration parameters for the message characteristic are used to configure the ONT, in which, each message characteristic configuration parameter includes: a message characteristic, an offset position in bytes of the message characteristic, a mask for the message characteristic and an identifier of the specified service transmission channel.

In the embodiment, the mask for the message characteristic takes the form of 1 matching. For example, when a message with the source IP address of 10.11.1.0~10.11.1.255 of a network section is to be identified, the message characteristic includes 4 bytes, in which 10.11.1.1 corresponds to (00001010, 00001011, 00000001 and 00000001), the mask for the message characteristic may be specified as (11111111, 11111111, 11111111, 00000000). A bitwise AND operation is performed between the message characteristic and the mask for the message characteristic, and the obtained operation result is the characteristic of the network section 10.11.1.0~10.11.1.255.

Step 502, a second type of message characteristic matching operation is performed after the ONT receives the service flow. If the message characteristic matching is successful, step 503 is executed; otherwise, step 504 is executed.

The second type of message characteristic matching operation includes specifically: performing one by one a bitwise AND operation on the mask for the message characteristic in the configuration parameters for the message characteristic and a corresponding message characteristic configured with, to obtain a first operation result; performing a bitwise AND operation on a part of data with a byte number the same as a corresponding message characteristic in a service flow data frame determined based on an offset position in bytes of the corresponding message characteristic, and the mask for the corresponding message characteristic, to obtain a second operation result; comparing the first operation result and the second operation result; executing step 503 if it is determined that the first operation result and the second operation result match each other, and executing step 504 if it is determined by the ONT that the first operation result and the second operation result based on any of the configuration parameters for the message characteristic configured with does not match each other.

Before the message characteristic matching operation, the step further includes determining by the ONT itself whether it supports the general service flow mapping operation. If the ONT supports the general service flow mapping operation, the message characteristic matching procedure is executed; otherwise, all the service flows received are mapped to a fixed service transmission channel.

Step 503, the comparison operation is stopped, and the service flow is mapped to the service transmission channel specified for the corresponding message characteristic.

In the step 503, mapping the service flow with matching message characteristic to the specified service transmission channel further includes remarking the priority flag of the service flow; or Before mapping the service flow with matching message characteristic to the specified service transmission channel, further including the step of remarking the priority of the service flow. In that case, mapping the service flow with matching message characteristic to the specified service transmission channel includes mapping the service flow to the specified service transmission channel according to the remarked priority.

Step 504, the ONT performs error alarm processing, and the procedure ends; or the service flow is mapped to corresponding service transmission channels according to the predetermined default mapping method.

Step 504 in one of the embodiment is optional. The method shown in FIG. 5 also applies to the case that the message characteristic is a series of continuous bytes in the message. The way of selecting message characteristics, service transmission channels in the embodiment shown in FIG. 5 is the same as that in the embodiment shown in FIG. 4, and will not be explained in detail here.

The methods in the embodiments shown in FIG. 4 and FIG. 5 may be applied to the uplink transmission of control messages. When the ONT receives the service flow, a message characteristic matching operation is performed, the control message service flow and the data message service flow in the service flow are mapped respectively to different transmission channels to be transmitted, and the high QoS requirement for the transmission of the control message service flow may be satisfied.

In order for the transmission of the control message service flow to have a high priority, the first method that may be used is to map the control message service flow matched with the configured message characteristic to a service transmission channel with high priority.

If the control message service flows of all users are mapped to the same T-CONT, mapping the control message service flow to a service transmission channel with high priority includes mapping the control message service flows of all users to the queue with high priority of the same T-CONT.

If the control message service flows of different users are mapped respectively to different T-CONT, mapping the control message service flow to a service transmission channel with high priority includes mapping the control message service flow of each user to the queue with high priority of the T-CONT corresponding to each user respectively.

In order for the transmission of the control message service flow to have a high priority, the second method that may be used is that the service transmission channel into which the control message service flow is mapped is set with a high priority by the ONT, after the control message service flows and data message service flows which match the configured message characteristics are mapped respectively to different service transmission channels.

The method of setting the service transmission channel to which the control message service flow is mapped with a high priority includes, setting by the ONT the Type of the T-CONT to which the control message service flow is mapped, to Type 2.

In order for the transmission of the control message service flow to have a high priority, the third method that may be used is to perform high priority processing on the control message service flow on the OLT, after the control message service flows and data message service flows which match the configured message characteristics are mapped respectively to different service transmission channels.

Performing high priority processing on the control message service flow on the OLT includes sending by the OLT the received control message service flow to the network, and setting the control message service flow with high priority.

Setting the control message service flow with high priority includes setting the 802.1p of the control message service flow with high priority.

It should be noted that the three methods may each be used separately, or may be used in combination. For example, one method is used every time; or method 1 and 3 are used at the same time; or method 2 and 3 are used at the same time.

The control message may be an Internet Group Management Protocol (IGMP) control message, a PPP protocol on Ethernet (PPPoE) control message, a Dynamic Host Configuration Protocol (DHCP) control message or a Session Initiation Protocol (SIP) control message.

Figure 6A:
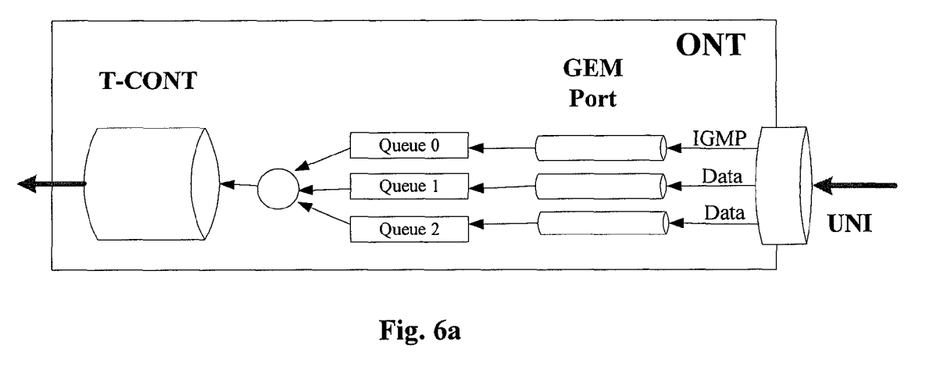
FIG. 6a is a diagram showing the first T-CONT assignment model in one embodiment of the invention.
Figure 6B:
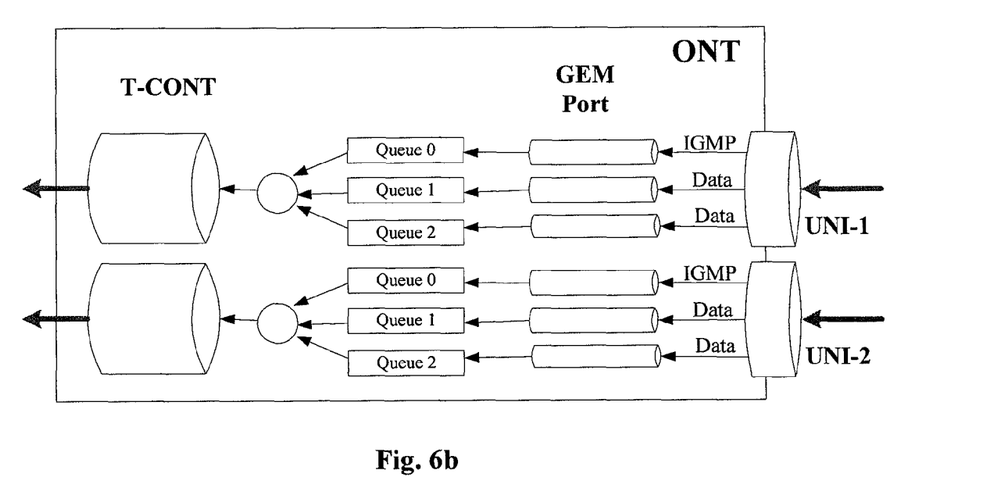
FIG. 6b is a diagram showing the second T-CONT assignment model in one embodiment of the invention.
Figure 6C:
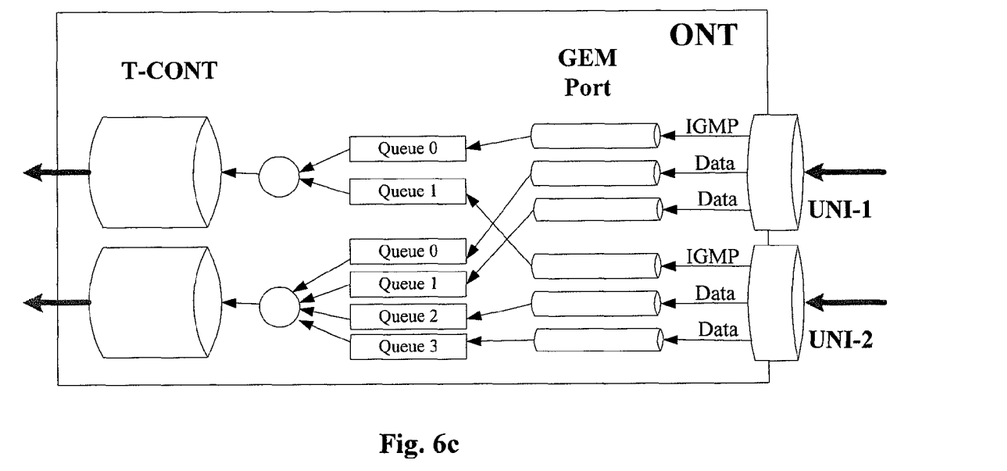
FIG. 6c is a diagram showing the third T-CONT assignment model in one embodiment of the invention.
Figure 6D:
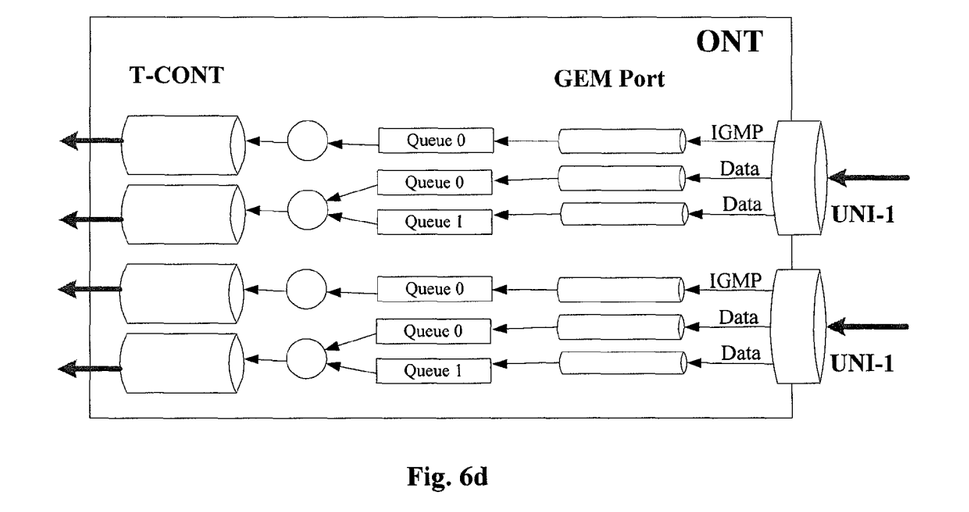
FIG. 6d is a diagram showing the fourth T-CONT assignment model in one embodiment of the invention.

In the GPON Common Technical Standards (CTS), many different kinds of application methods are defined for the T-CONT assignment of the ONT, and FIG. 6a, FIG. 6b, FIG. 6c, and FIG. 6d may be referred to for detail. In FIG. 6a, one T-CONT is assigned for each ONT. In FIG. 6b, one T-CONT is assigned for each user of each ONT. In FIG. 6c, one T-CONT is assigned for each type of service flows of each ONT. In FIG. 6d, one T-CONT is assigned for each type of service flows of each user of each ONT.

The transmission of IGMP control message and data message on ONT will be described with IGMP control message as an example, and the four types of T-CONT assignment application method shown in FIG. 6a, FIG. 6b, FIG. 6c and FIG. 6d.

Referring to FIG. 6a, the control messages of all users are mapped to the queue of high priority of the same T-CONT by the ONT. Specifically, for all users, after service flows are received from users, the IGMP control messages and data messages in the service flows are mapped into queues with different priorities of the same T-CONT using the methods provided in the embodiments described with FIG. 4 and FIG. 5, and sent to the OLT. In which, the priorities of the IGMP control messages are higher than the priorities of the data messages. In other words, the IGMP control messages are mapped to queues with higher priorities of the T-CONT.

Referring to FIG. 6b, the control messages of each user are mapped respectively by the ONT to queues of high priorities of the T-CONT to which each user corresponds to. Specifically, for each user, after the service flows are received from users by the ONT, the IGMP control messages and data messages in the service flows are mapped to queues with different priorities of the same T-CONT using the methods provided in the embodiments described with FIG. 4 and FIG. 5, and sent to the OLT. In which, the priorities of the IGMP control messages are higher than the priorities of the data messages. In other words, the IGMP control messages are mapped to queues with higher priorities of the T-CONT.

Referring to FIG. 6c, the type of the T-CONT which the control messages of all users are mapped into is set as Type 2 by the ONT. Specifically, for all users, after the service flows are received from users by the ONT, the IGMP control messages and data messages in the service flows are mapped to queues of different T-CONT using the methods provided in the embodiments described with FIG. 4 and FIG. 5, and sent to the OLT. The type of the T-CONT to which the IGMP control messages correspond is set as Type 2.

Referring to FIG. 6d, the type of the T-CONT which the control messages of each user are in is set as Type 2. Specifically, for each user, after the service flows are received from users by the ONT, the IGMP control messages and data messages in the service flows are mapped to queues of different T-CONT using the methods provided in the embodiments described with FIG. 4 and FIG. 5, and sent to the OLT. The type of the T-CONT to which the IGMP control messages correspond is set as Type 2.

It is obvious from the above description, using the methods provided in the embodiments of the invention may result in that the uplink control messages be transmitted in time, therefore, meeting the QoS requirement of the control messages.

The embodiments of the invention also provide a system for mapping a service flow to a service transmission channel, the system includes an ONT and an OLT, in which the OLT is configured to receive configuration parameters for a message characteristic sent from a configuration terminal, to process the configuration parameters for the message characteristic, and to send the configuration parameters for the message characteristic determined to the ONT;

The ONT is configured to configure with the configuration parameters for the message characteristic distributed by the OLT, and to map the service flow to a specified service transmission channel when it is determined that the service flow received matches the message characteristic configured after the service flow from the user is received.

The ONT is further configured to remark the priority of the service flow when mapping the service flow to the specified service transmission channel; or further remark the priority of the service flow before mapping the service flow to the specified service transmission channel, and determine the specified service transmission channel according to the remarked priority.

Figure 7:
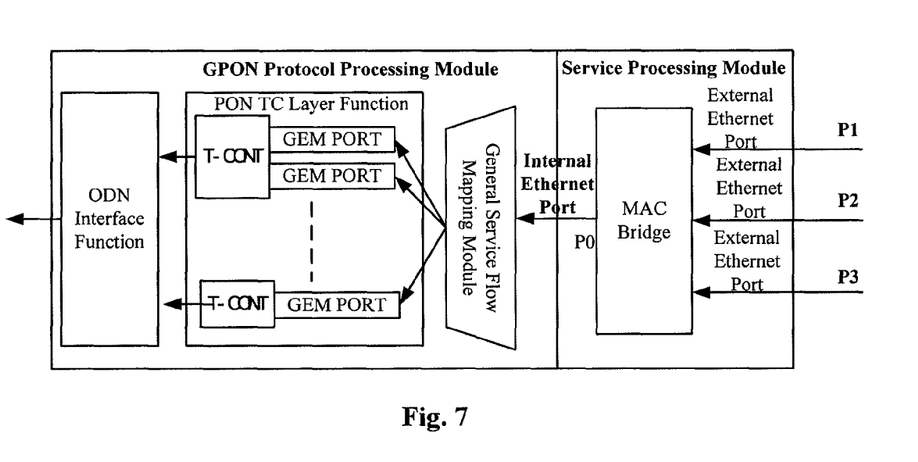
FIG. 7 is a diagram showing the structure of an ONT in one embodiment of the invention.

FIG. 7 is a diagram showing the ONT structure in one embodiment of the invention. As shown in FIG. 7, the ONT for mapping the service flow to the service transmission channel provided in one embodiment of the invention includes a service processing module and a general service flow mapping module.

The service processing module is configured to receive a service flow from a user, and to send the service flow received to the general service flow mapping module.

The general service flow mapping module is configured to configure with configuration parameters for a message characteristic distributed by the OLT, receiving the service flow from the service processing module, and mapping the service flow to a specified service transmission channel when it is determined that the service flow received matches the message characteristics configured.

The general service flow mapping module is further configured to remark the priority of the service flow when the service flow is mapped to the specified service transmission channel; or further configured to remark the priority flag of the service flow before mapping the service flow to the specified service transmission channel, and determining the specified service transmission channel according to the remarked priority.

The general service flow mapping module includes a message characteristic configuration module, a message characteristic matching module and a service flow mapping module.

The message characteristic configuration module is configured to receive the configuration parameters for the message characteristic from the service processing module and performing configuration.

The message characteristic matching module is configured to receive the service flow from the service processing module, matching the message characteristics configured by the message characteristic configuration module with the service flow, stopping the comparing when the service flow matches the message characteristic, and sending an instruction for service flow mapping to the service flow mapping module.

The service flow mapping module is configured to receive the instruction for service flow mapping from the message characteristic matching module and mapping the service flow to the specified service transmission channel.

For the case that the message characteristic is a sequence of continuous bytes in the message, the message characteristic matching module includes a first message characteristic matching module, which is configured to receive the service flow from the service processing module, and determining one by one a part of data in a service flow data frame with a byte number the same as a corresponding message characteristic, based on the offset position in bytes of the message characteristics configured by the message characteristic configuration module, and comparing the part of data with the corresponding message characteristic, stopping the comparing when it is determined that the part of data and the corresponding message characteristic match each other, and sending the instruction for mapping to the service flow mapping module.

For the case that the message characteristic is a sequence of continuous or non-continuous bytes in the message, the message characteristic matching module includes a second message characteristic matching module, which is configured to receive the service flow from the service processing module, and performing one by one a bitwise AND operation on the configured message characteristic and a corresponding mask to obtain a first operation result; performing a bitwise AND operation on the mask and a part of data with a byte number the same as the message characteristic in a service flow data frame determined based on an offset position in bytes of corresponding message characteristics, to obtain a second operation result; comparing the first operation result and the second operation result; stopping the comparing when it is determined that the first operation result and the second operation result match each other, and sending an instruction for mapping to the service flow mapping module.

The general service flow mapping module may further include a priority determining module.

The service flow mapping module is further configured to send an instruction for determining the priority to the priority determining module, receiving feedback information from the priority determining module, and mapping the service flow to a specified service transmission channel.

The priority determining module is configured to receive the instruction for determining priority from the service flow mapping module, retaining the priority of the service flow, and sending feedback information to the service flow mapping module; or remarking the priority of the service flow, determining the specified service transmission channel according to the remarked priority, and sending feedback information to the service flow mapping module.

In order to map the identified service flow to the specified service transmission channel, i.e., the GEM PORT, the general service flow mapping module receives Ethernet frames from the inner Ethernet port connected with the MAC bridge, classifying the Ethernet frames based on the message characteristics in the service flow configuration parameters for a message characteristic configured with, and mapping directly the Ethernet frames with different message characteristics to different service transmission channels. It may be selected to remark the priority of the service flow in the mean time, or to remark the Ethernet frames with different message characteristics with different priorities, and mapping the messages to different GEM PORT according to the remarked message priority flags. Different GEM PORTs converge into one T-CONT or are carried by a single T-CONT. The ONT sends data to the OLT based on T-CONT, with the T-CONT scheduled by the OLT.

The OLT is responsible for down sending configuration parameters for a message characteristic to the general service flow mapping module of the ONT. Specifically, the OLT sends the configuration parameters for the message characteristic to the general service flow mapping module by means of OMCI messages.

It is not feasible to send service flows with different characteristics to the GEM PORT or PVP/PVC using the management methods of the 802.1p mapping table ME (802.1p mapper service profile) in the GPON standard. The 802.1p mapping table ME defines corresponding GEM Interworking Termination Point ME pointer for each value of 802.1p, according to the eight different values of the 802.1p. When the IP address is used as the message characteristic, the number of IP addresses is the 32nd power of 2. When the VLAN ID is used as the message characteristic, the number of VLAN ID is 4096. If a corresponding GEM Interworking Termination Point ME pointer is specified for each characteristic of each message, the entries to be managed will be very complex. Therefore, the embodiments of the invention define a new general service flow mapping ME, in order to maintain the message characteristic, the mask for the message characteristic and the offset position in bytes of the message characteristic, so as to support the representation of the general message characteristics in the embodiments of the invention.

The property fields included in the general service flow mapping ME are shown in Table 5.

TABLE 5

| Property Field | |
| --- | --- |
| Number of the representation entries of the general message characteristic | The number of the representation entries of the general message characteristic supported by ONT |
| Representation entry 1 of the general message characteristic | The representation entry of the general message characteristic includes three fields:<br>the field of message characteristic<br>the mask for the field of message characteristic<br>the offset position in bytes of the field of message characteristic |
| The GEM Interworking Termination Point ME pointer and the remarked message priority flag which the general message characteristic representation entry 1 corresponds to | The GEM Interworking Termination Point ME pointer and the remarked message priority flag which the general message characteristic representation entry 1 corresponds to, being 0 means that the mapping of the message with matched characteristic should be canceled. |
| The general message characteristic representation entry 2 | The general message characteristic representation entry includes three fields:<br>the field of message characteristic<br>the mask for the field of message characteristic<br>the offset position in bytes of the field of message characteristic |
| The GEM Interworking Termination Point ME pointer and the remarked message priority flag which the general message characteristic representation entry 2 corresponds to | The GEM Interworking Termination Point ME pointer and the remarked message priority flag which the general message characteristic representation entry 2 corresponds to, being 0 means that the mapping of the message with matched characteristic should be canceled. |
| The general message characteristic representation entry 3 | The general message characteristic representation entry includes three fields:<br>the field of message characteristic<br>the mask for the field of message characteristic<br>the offset position in bytes of the field of message characteristic |
| The GEM Interworking Termination Point ME pointer and the remarked message priority flag which the general message characteristic representation entry 3 corresponds to | The GEM Interworking Termination Point ME pointer and the remarked message priority flag which the general message characteristic representation entry 3 corresponds to, being 0 means that the mapping of the message with matched characteristic should be canceled. |
| . . . | . . . |
| The general message characteristic representation entry N | The general message characteristic representation entry includes three fields:<br>the field of message characteristic<br>the mask for the field of message characteristic<br>the offset position in bytes of the field of message characteristic |

TABLE 5-continued

| Property Field | |
| --- | --- |
| The GEM Interworking Termination Point ME pointer and the remarked message priority flag which the general message characteristic representation entry N corresponds to | The GEM Interworking Termination Point ME pointer and the remarked message priority flag which the general message characteristic representation entry N corresponds to, being 0 means that the mapping of the message with matched characteristic should be canceled. |

The number of the general message characteristic representation entry in the general service flow mapping ME is defined according to the system specification of the OLT and ONT, the general message characteristic representation entry N, where N is an odd number, which includes three fields for storing respectively a message characteristic, a mask and an offset position in bytes of the message characteristic, the lengths of the three fields may be defined flexibly.

The GEM PORT-ID is stored in the corresponding property field of the corresponding GEM PORT Network Connection Termination Point ME (GEM Port Network CTP), the GEM Interworking Termination Point ME is used to store the pointer for locating the GEM PORT Network Connection Termination Point ME.

MAC Bridge Port Configuration Data ME is responsible for the management of the properties of various configuration data of the Ethernet port. If at the same time when the service flow is mapped to the specified service transmission channel, the priority of the service flow needs to be remarked, the MAC Bridge Port Configuration Data ME in the prior art should also be modified, and the property fields included in the new MAC Bridge Port Configuration Data ME are shown in Table 6.

TABLE 6

| Property Field | |
| --- | --- |
| MAC Bridge Port Number | The number of the MAC bridge |
| The type of the Termination Point | 0x1 means external Ethernet port; 0x2 means internal Ethernet port, connecting the GEM Interworking Termination Point ME; 0x3 means internal Ethernet port, connecting the general service flow mapping ME. |
| The pointer of the Termination Point | Termination Point type of 0x1 means external Ethernet port, the value of which field is the physical property of the Ethernet port; Termination Point type of 0x2 means internal Ethernet port,connecting the GEM Interworking Termination Point ME, the value of which field is the GEM Interworking Termination Point ME; Termination Point type of 0x3 means internal Ethernet port, connecting the general service flow mapping ME, the value of which field is the general service flow mapping ME. |
| Other configuration properties | |

Figure 8A:
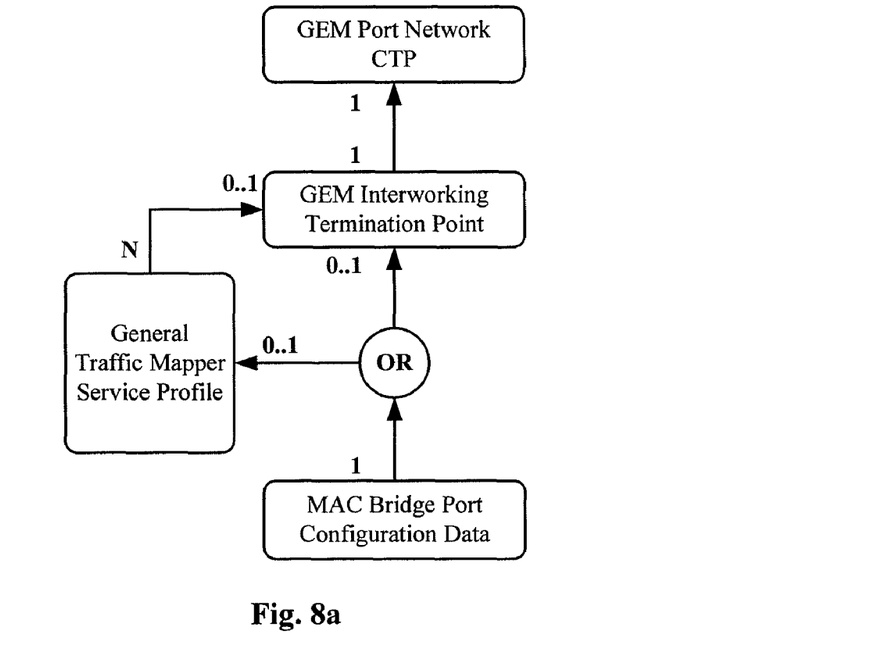
FIG. 8a is a first ME relationship diagram supporting a general service flow mapping in the invention.

If the priority of the service flow needs to be remarked when the service flow is mapped to the specified service transmission channel, the ME relationship diagram of the general service flow mapping ME is supported, as shown in FIG. 8a. The difference of FIG. 8 from the prior art ME relationship diagram lies in the 802.1 mapping table entity (802.1p Mapper Service Profile) in the prior art is replaced by a general service flow mapping ME (General Traffic Mapper Service Profile), the general service flow mapping ME may include N general message representation entries.

Figure 8B:
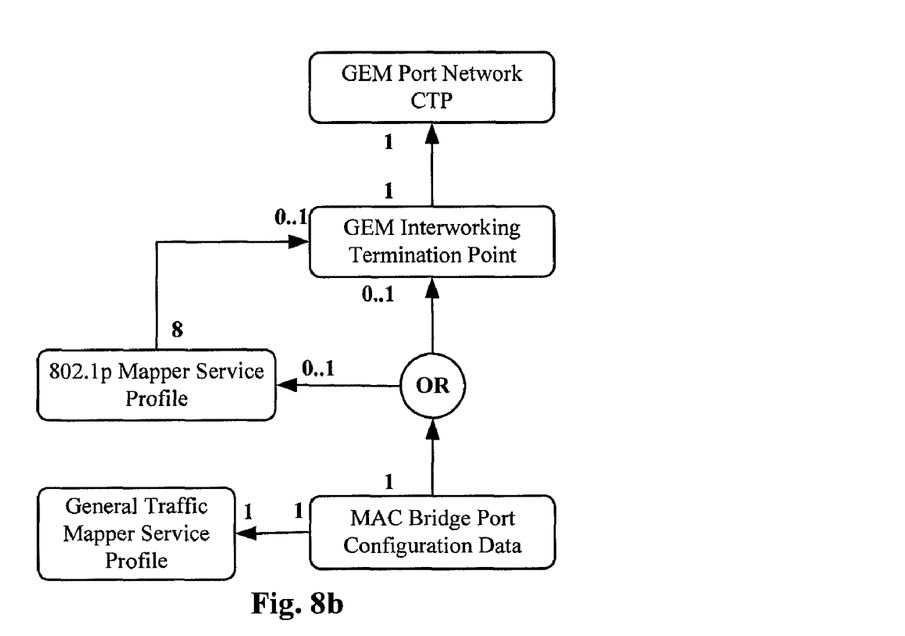
FIG. 8b is a second ME relationship diagram supporting a general service flow mapping in the invention.

If the priority of the service flow is remarked and the specified service transmission channel is determined according to the remarked priority before the service flow is mapped to the specified service transmission channel, the ME relationship diagram of the general service flow mapping ME is supported, as shown in FIG. 8b. FIG. 8b is different from the prior art ME relationship diagram in the addition of general service flow mapping ME (General Traffic Mapper Service Profile).

Figure 9:
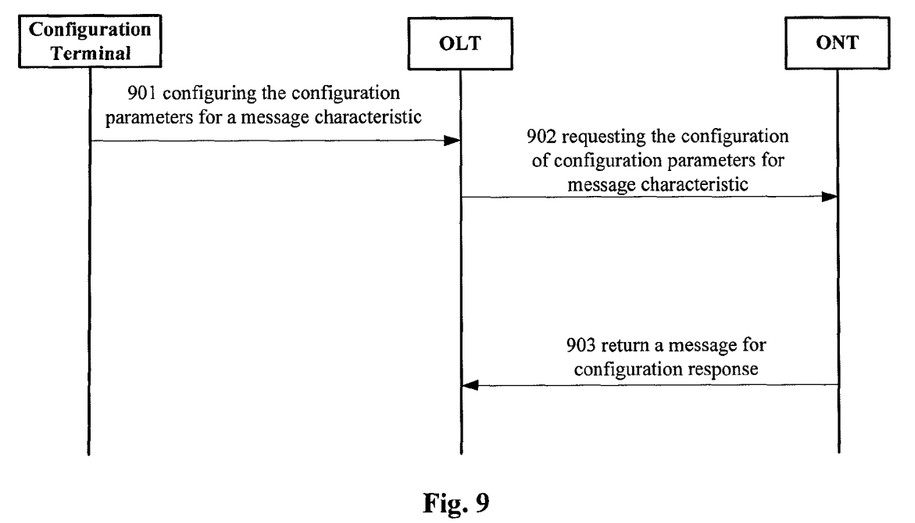
FIG. 9 is a flow chart showing the configuration for a general service flow mapping in the invention.

One embodiment of the configuration flow of the general service flow mapping ME is shown in FIG. 9. The embodiment takes as an example the case that the same OMCI channel message is configured with one property, which includes the following steps.

Step 901, the configuration terminal notifies the OLT to configure the property the general service flow mapping ME of the ONT connected by the OLT. The configuration parameters include ONUID, a message characteristic, a mask for the message characteristic, an offset position in bytes of the message characteristic, and GEM PORT-ID.

Step 902, the OLT transforms the GEM PORT data carried in the received configuration parameters into a GEM Interworking Termination Point ME pointer corresponding one-to-one to the GEM PORT, sends through the OMCI channel a message requesting the configuration of ONT general service flow mapping ME property. The message carries the following configuration parameters: ONUID, a message characteristic, a mask for the message characteristic, an offset position in bytes of the message characteristic, a GEM Interworking Termination Point ME pointer, and a priority flag of the remarked message.

The message characteristic, the mask for the message characteristic, the offset position in bytes of the message characteristic in the configuration parameters distributed to the OLT by the configuration terminal may be in a way easy to be understood by users, such as VLAND ID, IP addresses etc. The OLT splits the received VLAND ID and/or IP address into the message characteristic, the mask for the message characteristic and the offset position in bytes of the message characteristic to be distributed to the ONT.

Step 903, when the ONT configuration is completed, a response message of success or failure is returned.

Figure 10:
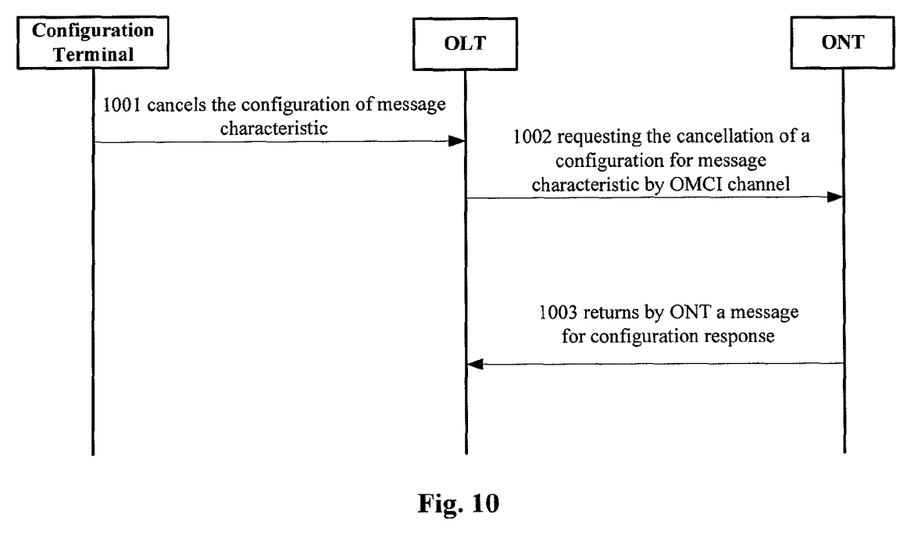
FIG. 10 is a flow chart showing the cancellation of the configuration for a general service flow mapping in the invention.

One embodiment of the invention further includes canceling the configuration of the general service flow mapping ME, which includes the steps shown in FIG. 10. In FIG. 10, the same OMCI channel message cancels the configuration of one message characteristic configuration parameter as an example, which includes the following steps.

Step 1001, the configuration terminal notifies the OLT to cancel the configuration of the property of the general service flow mapping ME of the ONT which the OLT connects. The configuration parameters include ONUID, the message characteristic, the mask for the message characteristic and the offset position in bytes of the message characteristic.

Step 1002, OLT sends through the OMCI channel a message requesting the cancellation of the configuration of the ONT general service flow mapping ME property. The message carries the following configuration parameters: ONUID, the message characteristic, the mask for the message characteristic, the offset position in bytes of the message characteristic and 0.

Step 1003, when the ONT configuration is completed, a response message of success or failure is returned.

The purpose, the technical solution and the advantageous effects of the invention are further described in more detail in the above. It should be understood that the description is not intended to limit the scope of the invention. All amendments, replacements, modifications in the scope of the spirit of the invention are all intended to be included in the scope of the invention.

What is claimed is:

1. A method for mapping a service flow to a service transmission channel, comprising:
    A. configuring an Optical Network Terminal (ONT) with message characteristic configuration parameters;
    B. mapping the service flow to a specified service transmission channel when it isdetermined that the service flow matches the configured message characteristic configuration parameters after the service flow is received by the ONT;
    wherein the step of mapping the service flow to the specified service transmission channel comprises:
    mapping first data from a first user or user network interface to a first queue of a first transmission container (T-CONT) via a first Giga-bit Passive Optical Network Encapsulation Method PORT (GEM PORT);
    mapping a first control message from the first user or user network interface to a second queue of the first T-CONT via a second GEM PORT, wherein the second queue has a higher priority than the first queue and has no data being mapped thereto, wherein the first control message includes at least one type of an Internet Group Management Protocol (IGMP) control message, a PPP protocol on Ethernet (PPPoE) control message, a Dynamic Host Configuration Protocol (DHCP) control message and a Session Initiation Protocol (SIP) control message.

2. The method according to claim 1, wherein the message characteristic configuration parameters comprise a message characteristic, an offset position in bytes of the message characteristic, a mask for the message characteristic, and an identifier of the specified service transmission channel;
    wherein the step of mapping the service flow to the specified service transmission channel comprises:
        performing one by one a first bitwise AND operation on the mask for the message characteristic and the message characteristic after the service flow is received by the ONT, to obtain a first operation result;
        performing a second bitwise AND operation on the mask for the message characteristic and a part of data with a byte number being identical to a corresponding message characteristic in a service flow data frame determined based on an offset position in bytes of the corresponding message characteristic, to obtain a second operation result;
        comparing the first operation result with the second operation result; and
        stopping the comparing when it is determined that the first operation result matches the second operation result, and mapping the service flow to the specified service transmission channel.

3. The method according to claim 1, wherein the step of mapping the service flow to the specified service transmission channel comprising:
    mapping second data from a second user or user network interface to a third queue of a second T-CONT via a third GEM PORT;
    mapping a second control message from the second user or user network interface to a forth queue of the second T-CONT via a forth GEM PORT, wherein the forth queue has higher priority than the third queue and has no data being mapped thereto, wherein the second control message includes at least one type of the IGMP control message, the PPPoE control message, the DHCP control message and the SIP control message.

4. The method according to claim 2, wherein after the comparing the part of data with the corresponding message characteristic the method further comprises:
    performing an error alarm processing and stopping operation by the ONT, when determining that the recieved service flow does not match any of the configured message characteristic; or
    mapping the service flow to a corresponding service transmission channel according to a predetermined default mapping method.

5. The method according to claim 2, wherein after comparing the first operation result with the second operation result the method further comprises:
    performing an error alarm processing and stopping the operation by the ONT when determining that the first operation result and the second operation result obtained based on any of the message characteristic configuration parameters do not match; or
    mapping the service flow to a corresponding service transmission channel according to a predetermined default mapping method.

6. The method according to claim 2, wherein before the step B the method further comprises:
    determining by the ONT whether the ONT itself supports a general service flow mapping operation; and
    performing the step B if it is determined that the ONT itself supports the general service flow mapping operation; otherwise, mapping all service flows received to a fixed service transmission channel.

7. The method according to claim 1, wherein the message characteristic configuration parameters comprise a priority flag of a remarked service flow;
    wherein the step of mapping the service flow to the specified service transmission channel comprises
    remarking a priority of the service flow using the priority flag to get the remarked service flow;
    determining the specified service transmission channel according to a remarked priority, and mapping the remarked service flow to the specified service transmission channel.

8. The method according to claim 1, wherein configuring the ONT with the message characteristic configuration parameters comprises:
    receiving by the ONT the message characteristic configuration parameters from a configuration terminal via an Optical Line Terminal (OLT); and
    configuring the ONT with the message characteristic configuration parameters;
    wherein the message characteristic configuration parameters are received by the ONT from the OLT via an ONT Management and Control Interface (OMCI) channel.

9. An Optical Network Terminal (ONT), comprising a processor configured to perform a method comprising:
- mapping first data from a first user or user network interface to a first queue of a first transmission container (T-CONT) via a first Giga-bit Passive Optical Network Encapsulation Method PORT (GEM PORT);
- mapping a first control message from the first user or user network interface to a second queue of the first T-CONT via a second GEM PORT, wherein the second queue has higher priority than the first queue, wherein the first control message includes at least one type of an Internet Group Management Protocol (IGMP) control message, a PPP protocol on Ethernet (PPPoE) control message, a Dynamic Host Configuration Protocol (DHCP) control message and a Session Initiation Protocol (SIP) control message.

10. The ONT according to claim 9, wherein the method further comprises:
- mapping second data from a second user or user network interface to a third GEM PORT that corresponds to a third queue of a second T-CONT;
- mapping a second control message from the second user or user network interface to a forth GEM PORT that corresponds to a forth queue of the second T-CONT, wherein the forth queue has higher priority than the third queue, wherein the second control message includes at least one type of the IGMP control message, the PPPoE control message, the DHCP control message and the SIP control message.

11. An Optical Network Terminal (ONT), comprising a processor configured to perform a method comprising:
- mapping data from at least one of a first and second users or user network interfaces to a first transmission container (T-CONT) via a first Giga-bit Passive Optical Network Encapsulation Method PORT (GEM PORT);
- mapping a first and second control messages from the first and second users or user network interfaces to at least one second T-CONT via a second GEM PORT, wherein the at least one second T-CONT each has higher priority than the first T-CONT and has no data being mapped thereto, wherein the first and second control messages include at least one type of an Internet Group Management Protocol (IGMP) control message, a PPP protocol on Ethernet (PPPoE) control message, a Dynamic Host Configuration Protocol (DHCP) control message and a Session Initiation Protocol (SIP) control message.

12. The ONT according to claim 11, wherein the first and second control message are mapped to respective GEM PORTs of a same second T-CONT.

13. The ONT according to claim 11, wherein the first and second control messages from the first and second users or user network interfaces are mapped to respective GEM PORTs of different second T-CONTs, respectively.

* * * * *